United States Patent

Besenmatter et al.

[11] 4,094,587
[45] June 13, 1978

[54] AFOCAL FRONT ATTACHMENT FOR ZOOM OBJECTIVE

[75] Inventors: Walter Besenmatter; Trude Muszumanski, both of Vienna, Austria

[73] Assignees: Karl Vockenhuber; Raimund Hauser, both of Vienna, Austria

[21] Appl. No.: 713,222

[22] Filed: Aug. 10, 1976

[30] Foreign Application Priority Data

Aug. 11, 1975 Austria .................................. 6231/75

[51] Int. Cl.² .............................................. G02B 15/10
[52] U.S. Cl. ....................................................... 350/184
[58] Field of Search ............................................ 350/184

[56] References Cited

U.S. PATENT DOCUMENTS 3,466,113  9/1969  Bentele ................................ 350/184

FOREIGN PATENT DOCUMENTS 449,434  6/1936  United Kingdom ................. 350/184

Primary Examiner—Paul A. Sacher
Attorney, Agent, or Firm—Montague & Ross

[57] ABSTRACT

A substantially afocal front attachment of variable magnification ratio, to be combined with a fixed-focus rear lens group in order to form a zoom objective, consists of two fixedly interconnected outer lens members and an axially shiftable biconvex intermediate lens member. The two outer lens members are negative menisci turning their convex sides toward the intermediate lens member. The objective has a varifocal ratio close to 2:1.

7 Claims, 1 Drawing Figure

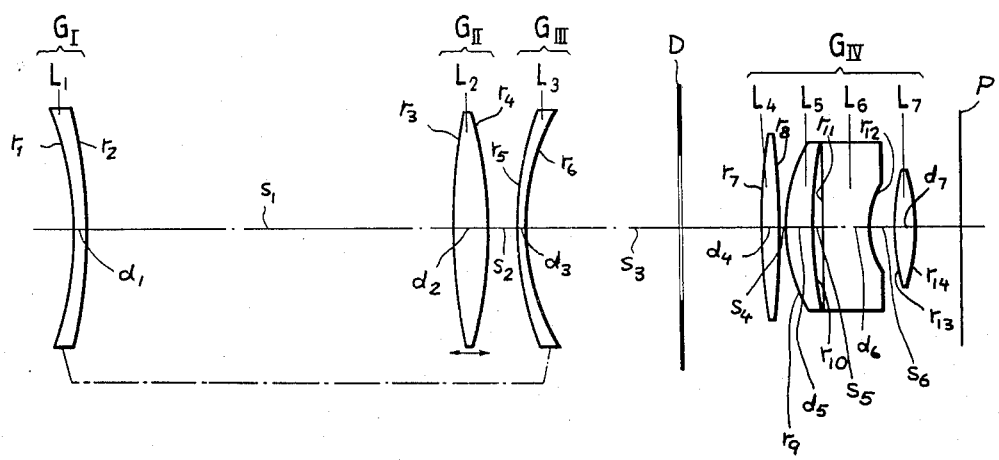

AFOCAL FRONT ATTACHMENT FOR ZOOM OBJECTIVE

FIELD OF THE INVENTION

Our present invention relates to a substantially afocal front attachment of variable magnification ratio for an optical objective, the attachment being juxtaposable with a rear lens group of fixed focal length in order to form therewith a varifocal or zoom objective particularly adapted for use in a projector.

BACKGROUND OF THE INVENTION

Front attachments of this type, comprising two rigidly interconnected negative lens members bracketing an axially shiftable positive lens member, are well known in the art; see, for example, British Pat. No. 449,434 and related essays by the inventor Gramatzki on the theory of so-called "transfactors". A system of this type has also been disclosed in U.S. Pat. No. 2,165,341.

In these prior objectives, according to their published or calculable data, the total axial length of the attachment (i.e. the distance between the outer vertices of the two negative lens members) substantially equals or even exceeds the focal length of the shiftable positive lens member. This results in a noticeable loss of brightness at the image periphery unless the diameter of the front lens is made impractically large.

OBJECTS OF THE INVENTION

The primary object of our present invention, therefore, is to provide an improved front attachment of the character described which affords a varifocal ratio close to 2 : 1 and which avoids the aforestated disadvantage of excessive axial length.

A more particular object is to provide an attachment of this type wherein the sum of its movable air spaces, accounting for almost the entire axial length, is at least 20% shorter than the focal length of its shiftable positive lens member.

It is also an object of our invention to provide an advantageous combination of such an attachment with a basic fixed-focus objective.

SUMMARY OF THE INVENTION

In accordance with our present invention, the negatively refracting first and third lens members are meniscus-shaped with their convex surfaces turned toward the positively refracting second lens member.

According to a more particular feature of our invention, the surface power $\Phi_{ng}$ of the concave surface of each fixed meniscus is related to the lens power $\Phi$ of that meniscus by a ratio $R = \Phi_{ng} : \Phi$ which ranges between substantially 1.3 and 2.5, preferably between about 1.3 and 1.5 for the first lens member and between about 2.4 and 2.5 for the third lens member. We also prefer to use a symmetrically biconvex lens for the shiftable second member.

In principle, a front attachment according to our invention can be used in combination with any fixed-focus lens group or basic objective of compatible size, yet we have found it particularly advantageous to use a basic objective of four air-spaced lens members of which only the next-to-last lens member, i.e. the second one from the image side, is negatively refracting as is well known per se. In such an objective the principal ray usually intersects the optical axis between the negative and the last positive lens member. The diameter of the front lens of the attachment can be held small by shifting the intersection between the axis and the principal ray toward the object side, yet in that case the oblique rays will strike the last lens member at points farther from the axis; while this will not significantly affect the total axial length of the objective, it may intensify off-axial distortions. We have found, in accordance with another feature of our invention, that this drawback can be avoided by making the individual focal length of the last (positive) lens member of the rear lens group larger than half the individual focal length of the first (also positive) lens member of that group.

BRIEF DESCRIPTION OF THE DRAWING

The above and other features of our invention will now be described in detail with reference to the accompanying drawing the sole FIGURE of which shows a varifocal projection objective including a substantially afocal front attachment according to our invention.

SPECIFIC DESCRIPTION

The varifocal objective shown in the drawing comprises a front attachment with three components $G_I$, $G_{II}$, $G_{III}$ and a rear lens group $G_{IV}$ separated from that attachment by a space containing a diaphragm D. Component $G_I$ consists of a first lens member $L_1$, with radii of curvature $r_1$, $r_2$ and thickness $d_1$, in the shape of a negative meniscus having a rearwardly facing convex surface. Component $G_{II}$ consists of a symmetrically biconvex lens member $L_2$ with radii $r_3$, $r_4$ and thickness $d_2$. Component $G_{III}$ consists of a lens member $L_3$ with radii $r_5$, $r_6$ and thickness $d_3$, this lens member being generally similar to lens member $L_1$ and rigidly connected therewith; the convex side of lens member $L_3$ faces forwardly, i.e. toward the relatively shiftable lens member $L_2$. All these lens members have been shown as singlets but could also be constituted by compound lenses, e.g. for the purpose of chromatic correction, as is well known per se. The variable air spaces separating lens $L_2$ from lenses $L_1$ and $L_3$ have been designated $s_1$ and $s_2$. The objective has a fixed image plane P.

The attachment $G_I$ - $G_{III}$ is substantially afocal within the range of its adjustability so that the width $s_3$ of the diaphragm space separating components $G_{III}$ and $G_{IV}$ is not critical. The two interconnected negative lenses $L_1$ and $L_3$ need therefore not be stationary although in practice it will be convenient to mount them in an axially fixed position with reference to the basic objective $G_{IV}$. The latter consists of four axially spaced lens members, namely a biconvex lens $L_4$ with radii $r_7$, $r_8$ and thickness $d_4$, a forwardly convex meniscus-shaped positive lens $L_5$ with radii $r_9$, $r_{10}$ and thickness $d_5$, a negative lens $L_6$ with a nearly planar front surface having radii $r_{11}$, $r_{12}$ and thickness $d_6$, and a biconvex lens $L_7$ with radii $r_{13}$, $r_{14}$ and thickness $d_7$. The air spaces between lenses $L_4$, $L_7$ have been designated $s_4$, $s_5$, $s_6$.

The single lenses $L_4$ - $L_7$ of the basic objective may, of course, also be replaced by compound lenses if desired.

Representative numerical values for the surface radii $r_1$ - $r_{14}$, the lens thicknesses $d_1$ - $d_7$ and the separations $s_1$, $s_2$, $s_4$ - $s_6$, in suitable linear units such as millimeters, will now be given in the following Table A together with their refractive indices $n_2$ and their Abbé numbers $v_d$. In this Table we have also shown the lens powers $\Phi$ and the surface powers of the concave sides of the two menisci $L_1$ and $L_3$ as well as the individual focal lengths $f_4$ and $f_7$ of lenses $L_4$ and $L_7$.

TABLE A

| | | | $n_d$ | $v_d$ | |
|---|---|---|---|---|---|
| $L_1$ { | $r_1 = -2.615$ | $d_1 = 0.098$ | 1.532 | 48.8 | $\Phi = -0.15097$ |
| | $r_2 = -10.282$ | | | | $\Phi_{ng} = -0.20344$ |
| | | $s_1 = 2.876-0.196$ | | | |
| $L_2$ { | $r_3 = +5.229$ | $d_2 = 0.275$ | 1.641 | 60.1 | |
| | $r_4 = -5.229$ | | | | |
| | | $s_2 = 0.218-2.898$ | | | |
| $L_3$ { | $r_5 = +3.291$ | $d_3 = 0.098$ | 1.623 | 58.1 | $\Phi = -0.13250$ |
| | $r_6 = +1.914$ | | | | $\Phi_{ng} = -0.32550$ |
| $L_4$ { | $r_7 = +1.561$ | $d_4 = 0.116$ | 1.620 | 60.3 | $f_4 = +2.336$ |
| | $r_8 = -19.610$ | | | | |
| | | $s_4 = 0.010$ | | | |
| $L_5$ { | $r_9 = +0.732$ | $d_5 = 0.222$ | 1.641 | 60.1 | |
| | $r_{10} = +4.563$ | | | | |
| | | $s_5 = 0.024$ | | | |
| $L_6$ { | $r_{11} = -33.403$ | $d_6 = 0.392$ | 1.741 | 27.6 | |
| | $r_{12} = +0.491$ | | | | |
| | | $s_6 = 0.196$ | | | |
| $L_7$ { | $r_{13} = +2.564$ | $d_7 = 0.105$ | 1.757 | 47.8 | $f_7 = +1.252$ |
| | $r_{14} = -1.479$ | | | | |

The individual focal length of the second lens $L_2$ will be found to equal 4.121. The air spaces $s_1$ and $s_2$ of the front attachment have a combined length of 3.094 which is less than 80% of that individual focal length. The total axial length of attachment $L_1 - L_3$, i.e. the sum of lens thicknesses $d_1$, $d_2$, $d_3$ and air spaces $s_1$, $s_2$, equals 3.565 and is therefore significantly less than this focal length.

The diaphragm space $s_3$, omitted from the Table because of its optical insignificance, may have a numerical value of 1.065, for example.

The varifocal objective according to Table A has a relative aperture of 1 : 1.3 and an overall focal length ranging between $f_{min} = 0.999$ and $f_{max} = 1.892$. Without the attachment, the group of lenses $L_4 - L_7$ has a focal length of 1.400.

In the next two Tables we have given alternate values for the front lens $L_1$, all the other values remaining the same as in Table A.

TABLE B

| | | | $n_d$ | $v_d$ | |
|---|---|---|---|---|---|
| $L_1$ { | $r_1 = -2.353$ | $d_1 = 0.098$ | 1.532 | 48.8 | $101 = -0.15097$ |
| | $r_2 = -7.194$ | | | | $\Phi_{ng} = -0.22609$ |

TABLE C

| | | | $n_d$ | $v_d$ | |
|---|---|---|---|---|---|
| $L_1$ { | $r_1 = -2.517$ | $d_1 = 0.098$ | 1.532 | 48.8 | $\Phi = -0.15097$ |
| | $r_2 = -8.936$ | | | | $101_{ng} = -0.21136$ |

We claim:

1. A substantially afocal front attachment of variable magnification ratio for an optical objective, consisting of a first, a second and a third lens member axially spaced from one another, said first and third lens members being negatively refracting and rigidly interconnected, said second lens member being positively refracting and axially movable with reference to said first and third lens members;

said first lens member $L_1$, said second lens member $L_2$ and said third lens member $L_3$ having radii of curvature $r_1 - r_6$, thicknesses $d_1 - d_3$, axial separations $s_1 - s_2$, refractive indices $n_d$ and Abbé numbers $v_d$ substantially as given in the following table:

| | | | $n_d$ | $v_d$ |
|---|---|---|---|---|
| $L_1$ { | $r_1 = -2.6$ | $d_1 = 0.1$ | 1.53 | 48 |
| | $r_2 = -10.3$ | | | |
| | | $s_1 = 2.9 - 0.2$ | | |
| $L_2$ { | $r_3 = +5.2$ | $d_2 = 0.3$ | 1.64 | 60 |
| | $r_4 = -5.2$ | | | |
| | | $s_2 = 0.2 - 2.9$ | | |
| $L_3$ { | $r_5 = +3.3$ | $d_3 = 0.1$ | 1.62 | 58 |
| | $r_6 = +1.9$ | | | |

2. A substantially afocal front attachment of variable magnification ratio for an optical objective, consisting of a first, a second and a third lens member axially spaced from one another, said first and third lens members being negatively refracting and rigidly interconnected, said second lens member being positively refracting and axially movable with reference to said first and third lens members;

said first lens member $L_1$, said second lens member $L_2$ and said third lens member $L_3$ having radii of curvature $r_1 - r_6$, thicknesses $d_1 - d_3$, axial separations $s_1$ and $s_2$, refractive indices $n_d$ and Abbé numbers $v_d$ substantially as given in the following table:

| | | | $n_d$ | $v_d$ |
|---|---|---|---|---|
| $L_1$ { | $r_1 = -2.4$ | $d_1 = 0.1$ | 1.53 | 48 |
| | $r_2 = -7.2$ | | | |
| | | $s_1 = 2.9 - 0.2$ | | |
| $L_2$ { | $r_3 = +5.2$ | $d_2 = 0.3$ | 1.64 | 60 |
| | $r_4 = -5.2$ | | | |
| | | $s_2 = 0.2 - 2.9$ | | |
| $L_3$ { | $r_5 = +3.3$ | $d_3 = 0.1$ | 1.62 | 58 |
| | $r_6 = +1.9$. | | | |

3. A substantially afocal front attachment of variable magnification ratio for an optical objective, consisting of a first, a second and a third lens member axially spaced from one another, said first and third lens members being negatively refracting and rigidly interconnected, said second lens member being positively refracting and axially movable with reference to said first and third lens members;

said first lens member $L_1$, said second lens member $L_2$ and said third lens member $L_3$ having radii of curvature $r_1 - r_6$, thicknesses $d_1 - d_3$, axial separations $s_1$ and $s_2$, refractive indices $n_d$ and Abbé numbers $v_d$ substantially as given in the following table:

| | | | $n_d$ | $v_d$ |
|---|---|---|---|---|
| $L_1$ { | $r_1 = -2.5$ | $d_1 = 0.1$ | 1.53 | 48 |
| | $r_2 = -8.9$ | | | |

-continued

|  |  |  | $n_d$ | $v_d$ |
|---|---|---|---|---|
|  |  | $s_1 = 2.9 - 0.2$ |  |  |
| $L_2$ | $r_3 = +5.2$ | $d_2 = 0.3$ | 1.64 | 60 |
|  | $r_4 = -5.2$ |  |  |  |
|  |  | $s_2 = 0.2 - 2.9$ |  |  |
| $L_3$ | $r_5 = +3.3$ | $d_3 = 0.1$ | 1.62 | 58 |
|  | $r_6 = +1.9.$ |  |  |  |

4. An optical objective comprising a substantially afocal front attachment of variable magnification ratio and a rear lens group of fixed focal length following said front attachment;

said front attachment consisting of a first, a second and a third lens member axially spaced from one another, said first and third lens members being negatively refracting and rigidly interconnected, said second lens member being positively refracting and axially movable with reference to said first and third lens members; said negatively refracting lens members being meniscus-shaped with convex surfaces turned toward said second lens member;

said rear lens group consisting of a positively refracting fourth lens $L_4$, a positively refracting fifth lens $L_5$, a negatively refracting sixth lens $L_6$ and a positively refracting seventh lens $L_7$ having radii of curvature $r_7 - r_{14}$, thicknesses $d_4 - d_7$, axial separations $s_4 - s_6$, refractive indices $n_d$ and Abbé numbers $v_d$ substantially as given in the following table:

|  |  |  | $n_d$ | $v_d$ |
|---|---|---|---|---|
| $L_4$ | $r_7 = +1.6$ | $d_4 = 0.1$ | 1.62 | 60 |
|  | $r_8 = -19.6$ |  |  |  |
|  |  | $s_4 = 0.01$ |  |  |
| $L_5$ | $r_9 = +0.7$ | $d_5 = 0.2$ | 1.64 | 60 |
|  | $r_{10} = +4.6$ |  |  |  |
|  |  | $s_5 = 0.02$ |  |  |
| $L_6$ | $r_{11} = -33.4$ | $d_6 = 0.4$ | 1.74 | 28 |
|  | $r_{12} = +0.5$ |  |  |  |
|  |  | $s_6 = 0.2$ |  |  |
| $L_7$ | $r_{13} = +2.6$ | $d_7 = 0.1$ | 1.75 | 48 |
|  | $r_{14} = -1.5$ |  |  |  |

5. An optical system as defined in claim 4 wherein said first lens member $L_1$, said second lens member $L_2$ and said third lens member $L_3$ have radii of curvature $r_1 - r_6$, thicknesses $d_1 - d_3$, axial separations $s_1 - s_2$, refractive indices $n_d$ and Abbé numbers $v_d$ substantially as given in the following table:

|  |  |  | $n_d$ | $v_d$ |
|---|---|---|---|---|
| $L_1$ | $r_1 = -2.6$ | $d_1 = 0.1$ | 1.53 | 48 |
|  | $r_2 = -10.3$ |  |  |  |
|  |  | $s_1 = 2.9 - 0.2$ |  |  |
| $L_2$ | $r_3 = +5.2$ | $d_2 = 0.3$ | 1.64 | 60 |
|  | $r_4 = -5.2$ |  |  |  |
|  |  | $s_2 = 0.2 - 2.9$ |  |  |
| $L_3$ | $r_5 = +3.3$ | $d_3 = 0.1$ | 1.62 | 58 |
|  | $r_6 = +1.9$ |  |  |  |

6. An optical system as defined in claim 4 wherein said first lens member $L_1$, said second lens member $L_2$ and said third lens member $L_3$ have radii of curvature $r_1 - r_6$, thicknesses $d_1 - d_3$, axial separations $s_1$ and $s_2$, refractive indices $n_d$ and Abbé numbers $v_d$ substantially as given in the following table:

|  |  |  | $n_d$ | $v_d$ |
|---|---|---|---|---|
| $L_1$ | $r_1 = -2.4$ | $d_1 = 0.1$ | 1.53 | 48 |
|  | $r_2 = -7.2$ |  |  |  |
|  |  | $s_1 = 2.9 - 0.2$ |  |  |
| $L_2$ | $r_3 = +5.2$ | $d_2 = 0.3$ | 1.64 | 60 |
|  | $r_4 = -5.2$ |  |  |  |
|  |  | $s_2 = 0.2 - 2.9$ |  |  |
| $L_3$ | $r_5 = +3.3$ | $d_3 = 0.1$ | 1.62 | 58 |
|  | $r_6 = +1.9.$ |  |  |  |

7. An optical system as defined in claim 4 wherein said first lens member $L_1$, said second lens member $L_2$ and said third lens member $L_3$ have radii of curvature $r_1 - r_6$, thicknesses $d_1 - d_3$, axial separations $s_1$ and $s_2$, refractive indices $n_d$ and Abbé numbers $v_d$ substantially as given in the following table:

|  |  |  | $n_d$ | $v_d$ |
|---|---|---|---|---|
| $L_1$ | $r_1 = -2.5$ | $d_1 = 0.1$ | 1.53 | 48 |
|  | $r_2 = -8.9$ |  |  |  |
|  |  | $s_1 = 2.9 - 0.2$ |  |  |
| $L_2$ | $r_3 = +5.2$ | $d_2 = 0.3$ | 1.64 | 60 |
|  | $r_4 = -5.2$ |  |  |  |
|  |  | $s_2 = 0.2 - 2.9$ |  |  |
| $L_3$ | $r_5 = +3.3$ | $d_3 = 0.1$ | 1.62 | 58 |
|  | $r_6 = +1.9.$ |  |  |  |

* * * * *